Feb. 27, 1968  E. MEYER  3,371,190
APPARATUS AND METHOD FOR PERFORATING SHEET PLASTIC BY MEANS
OF AN ELECTRON BEAM
Filed July 26, 1965  2 Sheets-Sheet 1
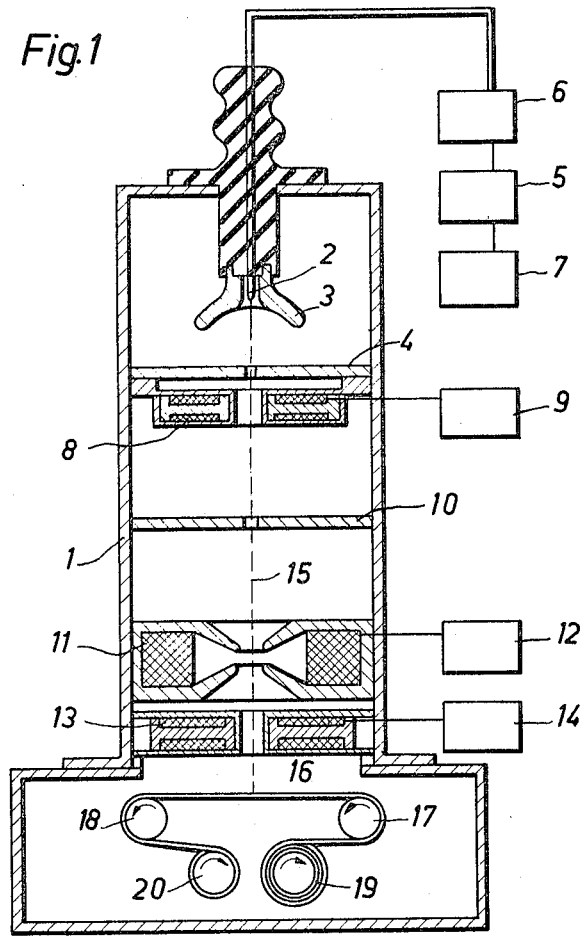
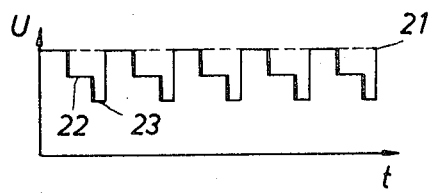

United States Patent Office 3,371,190
Patented Feb. 27, 1968

3,371,190
APPARATUS AND METHOD FOR PERFORATING SHEET PLASTIC BY MEANS OF AN ELECTRON BEAM
Edgar Meyer, 2 Karolingerstrasse, 8031 Gilching, Germany
Filed July 26, 1965, Ser. No. 474,672
Claims priority, application Germany, July 24, 1964, St. 22,452
5 Claims. (Cl. 219—384)

ABSTRACT OF THE DISCLOSURE

Prior to perforating a plastic with a beam of charged particles, the area of the plastic at which the perforation is to be made is subjected to an application of charged particles having a power density insufficient to perforate the plastic. This stiffens the plastic so that it resists being deformed by the action of the perforating beam subsequently applied.

This invention relates to an improved method and apparatus for removing material from plastics and, more particularly, for perforating plastic sheets.

The production of surface or colloid filters by perforating a thin metal or plastic foil with a multitude of small holes by means of electron beams is known to the art. For this purpose, an electron beam may be used, which is moved from one impact point to another, but use may also be made of several electron beams striking the foil simultaneously at different points. It is only necessary that the holes thus produced should be as uniform as possible, while the surface quality of the foil is of no consequence.

The present invention is based on the problem of making plastics, and particularly plastic foils, previous to gas by providing them with a multitude of holes. In this case, the surface quality is of considerable importance, since the surface of the plastic material should be plane after the perforations are made.

It appears logical to use the well known method of making colloid filters for perforating plastics as well, i.e. to bore a multitude of holes in the plastic by means of electron beams.

Experiments have shown that in the majority of cases two difficulties are encountered. First, the plastic in the immediate vicinity of the perforating beam tends to form bubbles and to char. Second, the surfaces around the perforated hole tends to buckle upward in the form of a bulge or cone, thus, destroying the flatness of the plastic surface.

As is to be expected, the first mentioned difficulty can be overcome by the well known expedient of using a beam of high power density. As a result, the boring time per hole can be kept very short, so that the surroundings of the hole are no longer exposed to excessive heating. However, this measure has no effect on the second difficulty.

It is, therefore, the purpose of the present invention to describe a method for removing material from plastics, and particularly for perforating plastics by means of beams of charged particles, also termed corpuscular beams, said method avoiding any deformation of the plastic surface during boring.

In accordance with the invention, this aim is reached by applying energy to the plastic surface before the machining operation proper. This supply of energy has a certain stiffening effect on the surface which is thus prevented from buckling up during the boring operation.

This stiffening effect can be traced back either to partial evaporation of the plasticizer or to crosslinking processes. It is also possible that both these effects or even other effects not mentioned here may be involved.

It is particularly advantageous to supply the energy in the form of corpuscular beam bombardment. The corpuscular beam employed for producing the hole may be used with advantage for this purpose by allowing it to strike the surroundings of the bore hole in a defocused manner before the boring operation, and focusing it immediately thereafter in order to produce the hole. However, a separate beam may likewise be used to supply the energy.

It is especially advantageous to use a high intensity corpuscular beam for boring, and above all to use a higher intensity that would be necessary for perforation alone. In this case, the corpuscules are scattered, i.e. from the corresponding bore into the surrounding material. The energy of these scattered corpuscules and the heat radiated by the bore form a halo around the bore. Within this halo, the material is sufficiently stiffened, so that holes can be satisfactorily bored within this halo without any further measures being required. Thus, if the beam intensity is chosen so that the halo of one or more bores is large enough to include the following bores within such halos, holes can be satisfactorily bored without additional exposure to radiation and without deformation of the surface.

The same effect can also be achieved if the machining beam is given an intensity distribution ensuring that a surface area around the central beam producing the hole is struck by the beam intensity required for stiffening, this surface area being large enough also to cover the points at which the adjacent holes are to be bored.

Such an intensity distribution of the corpuscular beam can, for example, be achieved by choosing the aperture of the beam passing through the focusing lens so that the spherical abberation of said lens becomes noticeable. The lens will then focus only the central portion of the beam sharply on the surface of the material, while an intensity insufficient for machining (but sufficient for stiffening) will be available in the surroundings of this focus.

As an alternative, the plastic surface may be exposed to electromagnetic radiation, or the surface may be brought into contact with a hot medium before matching. In every case it is, however, advisable to supply energy only to the immediate vicinity of the spot to be machined.

Having briefly described the invention, it will be described in greater detail in the following detailed description which may be more easily understood by reference to the accompanying drawings, of which:

FIG. 1 is a cross sectional elevation view of apparatus in accordance with the present invention which may be used for the method of this invention;

FIG. 2 is a plot of the pulses applied to the control electrode of the beam generating system;

Figure 3:
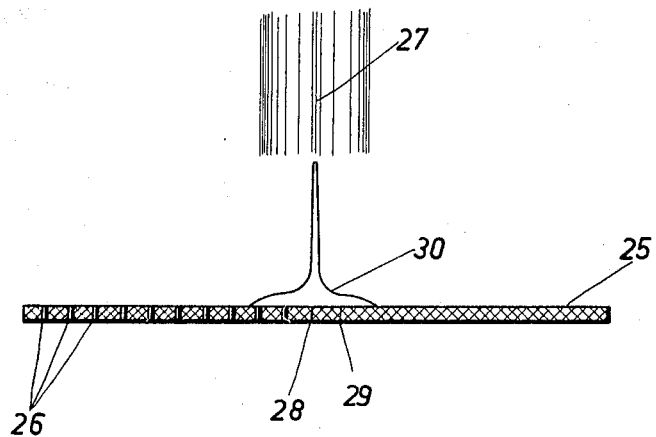
FIG. 3 is a diagrammatic view, partially in section showing the intensity distribution of a boring electron beam.

In FIG. 1, there is shown a device 1 for removing material with the aid of an electron beam. This device contains a beam generating system consisting of the cathode 2, the control electrode 3 and the grounded anode 4. The unit 5 serves to generate the high voltage of, for example, 100 kv. The unit 6 generates the heating current for the cathode 2, while the unit 7 serves to supply the power for the control electrode 3.

Below the anode 4 is an electromagentic deflection field 8 serving for beam adjustment, the power supply of which is ensured by the unit 9.

Below the deflection system 8 a diaphragm 10 is provided, which can be shifted in the diaphragm plane by conventional means (not shown in the figure). The electromagnetic focusing lens 11, whose power supply unit is marked 12, serves to focus the electron beam 15 onto the plastic foil 16. Below the lens 11 is another electromagnetic deflection system 13, the power supply unit of which is marked 14, which serves to deflect the beam 15 over the foil 16.

The plastic foil 16 to be perforated is wound on the supply drum 19, from where it runs via the rollers 17 and 18 onto the drum 20.

The rollers 17 and 18 advance the foil 16 with constant speed from right to left. During this motion, the deflection system 13 deflects the electron beam 15 in such a manner that it moves over said foil along parallel lines which are essentially perpendicular to the foil's direction of advance. During its movement along such a line, the beam is made to operate only at a few points, so that as a result the foil 16 is perforated by a number of equidistant holes.

FIG. 2 illustrates the timing of the voltage generated in the unit 7 and applied to the control electrode 3. The cut-off voltage, i.e. the voltage at which the generating system does not emit an electron beam, is designated by dashed line 21. The unit 7 generates a sequence of stepped pulses, each pulse consisting of the steps 22 and 23.

The focusing lens 11 is adjusted so that the electron beam 15 is focused on the foil 16 during step 23. This focused beam has a high power density, so that a hole is produced in the foil 16 within a very short period of time, thus, preventing excessive heating of the edges of said hole.

During the preceding step 22, the beam current is reduced. As a result, the focus of the beam 15 shifts in the axial direction. Consequently, the foil 16 is struck by a defocused beam during the step 22, which supplies energy to the surroundings of the next bore hole. Immediately after this supply of energy, the beam 15 is focused during the step 23 and at the same time the beam current increased. A bore is thus produced at the pretreated point.

In the intervals between pulses, the beam 15 is moved from one machining point to another.

FIG. 3 shows a plastic foil 25 in which the holes 26 have been bored. An electron beam 27 serves for boring. Its intensity distribution with respect to the impact point 28 is represented by the curve 30. It is obvious that the aforementioned distribution is such as to form a peak at the locus of the impact point 28 causing a hole to be produced at this point. Around the impact point 28, a certain intensity exists which is too low to have a machining effect, but which is sufficient to stiffen the surface so as to prevent any deformation during the subsequent machining operation. In this connection, special mention must be made of the fact that the intensity required for stiffening is achieved over an area which covers the following machining point 29 as well. The foil 25 can, thus, be processed by means of the beam 27 without any additional measures being required.

This invention may be variously modified and embodied within the scope of the subjoined claims.

What is claimed is:

1. A method of perforating sheet plastic by means of a beam of charged particles without causing surface deformations, comprising: applying to the area of the plastic to be perforated charged particles having a power density less than required for perforating the plastic, thereby to stiffen the plastic in said area; and applying to said area a beam of charged particles having a sufficiently high power density to perforate the plastic.

2. The method of claim 1 in which a defocused beam of charged particles is first applied to said area and said beam is thereafter focused to impinge at the point in said area where the perforation is to be formed.

3. The method of claim 1 in which a beam of charged particles applied to said area is so focused that, within a central portion of the beam, the power density of the charged particles is sufficient to perforate the plastic and within a halo surrounding said central portion the power density is insufficient for perforation, said halo extending over an area within which a perforation is to be subsequently produced.

4. The method of claim 1 in which a beam of charged particles applied to produce a perforation in the plastic has an intensity sufficiently higher than required for perforating the plastic to cause some of the particles to scatter and form a halo of charged particles having a power density insufficient for perforation, said halo extending over an area within which a perforation is to be subsequently made.

5. Apparatus for perforating plastic by means of a beam of charged particles comprising: means for supporting a plastic sheet to be perforated; an electron beam generating system including an electrode for controlling the emission of an electron beam therefrom; and means for applying voltage to said control electrode in a sequence of stepped pulses; each of said pulses having one step, at which the beam is focused on said plastic to perforate it, and another step, at which the beam is defocused to reduce the intensity of the beam at the surface of the plastic below the level required for perforation, whereby the beam is defocused for stiffening the plastic before the focused beam is applied to perforate it.

References Cited

UNITED STATES PATENTS

| | | | |
|---|---|---|---|
| 2,668,133 | 2/1954 | Brophy et al. | 156—272 |
| 2,861,166 | 11/1958 | Cargill | 219—68 |
| 3,033,974 | 5/1962 | Schleich et al. | 219—117 |
| 3,293,587 | 12/1966 | Robinson | 338—300 |
| 2,902,583 | 9/1959 | Steigerwald | 219—50 |
| 2,978,569 | 4/1961 | Boretti et al. | 219—69 |

FOREIGN PATENTS

| | | |
|---|---|---|
| 1,353,054 | 1/1964 | France. |
| 1,033,816 | 7/1958 | Germany. |

RICHARD M. WOOD, *Primary Examiner.*

VOLODYMYR Y. MAYEWSKY, *Examiner.*